N. L. HAYDEN.
VEHICLE WHEEL.
APPLICATION FILED SEPT. 19, 1914.
1,144,473.
Patented June 29, 1915.
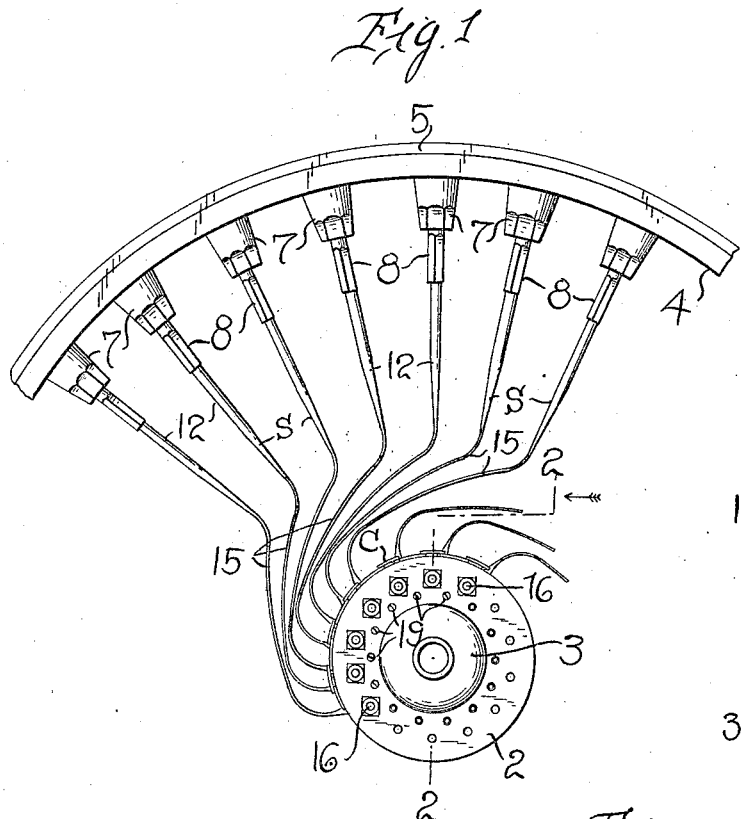
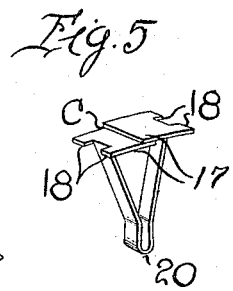
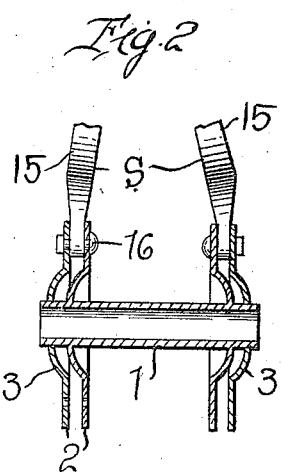
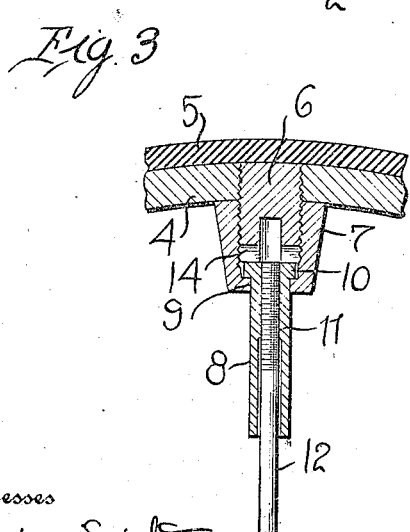
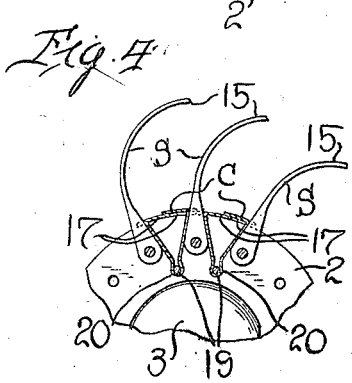
Witnesses
Robert M. Sutphen
V. J. Dowrick
Inventor
N. L. HAYDEN
By Watson E. Coleman
Attorney

UNITED STATES PATENT OFFICE.

NOAH L. HAYDEN, OF BISBEE, ARIZONA.

VEHICLE-WHEEL.

1,144,473.	Specification of Letters Patent.	Patented June 29, 1915.

Application filed September 19, 1914. Serial No. 862,544.

*To all whom it may concern:*

Be it known that I, NOAH L. HAYDEN, a citizen of the United States, residing at Bisbee, in the county of Cochise and State of Arizona, have invented certain new and useful Improvements in Vehicle-Wheels, of which the following is a specification, reference being had to the accompanying drawings.

This invention relates to certain improvements in wheels and has for an object to provide a device of this general character having novel and improved means whereby vibration or shock incident to the travel may be substantially entirely eliminated without the use of a pneumatic tire or the like.

Furthermore, it is an object of my invention to provide a device of this general character including a plurality of resilient spokes, each of said spokes being of a novel and improved construction whereby the weight thereon when standing perpendicular is received on a substantially horizontal intermediate portion whereby all vibrations are substantially absorbed before reaching the axle of the wheel.

It is a further object of my invention to provide a wheel of this general character having novel and improved means whereby all strains incident to side sweeping of the wheel are compensated for and thus assure additional strength to the wheel.

My invention also has for its object to provide a device of this general character whereby the spokes comprised therein may be removed or applied with convenience and facility without the necessity of disassembling the wheel proper in any manner.

My invention also contemplates for an object to provide a device of this general character wherein the hub extremities of the spokes are pivotally engaged between spaced disks, and having novel and improved means positioned between the disks and intermediate adjacent spokes for preventing dust or other foreign substances from entering between the disks or flanges which would otherwise have a tendency to impair the efficiency of the wheel.

The invention consists in the details of construction and in the combination and arrangement of the several parts of my improved wheel whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a fragmentary view, in elevation, of a wheel constructed in accordance with an embodiment of my invention: Fig. 2 is a sectional view taken substantially on the line 2—2 of Fig. 1; Fig. 3 is an enlarged fragmentary view in section illustrating in detail the connection between a spoke and the rim of the wheel as herein set forth; Fig. 4 is a fragmentary view, partly in elevation and partly in section, illustrating the guard members herein included in operative position; and Fig. 5 is an enlarged view, detached, in perspective of one of the guard members.

As disclosed in the accompanying drawings, 1 denotes a hub of predetermined dimensions and having arranged adjacent each end the spaced annular flanges 2—2, the central portions 3 whereof being convexed in order to impart additional strength thereto in a manner and for a purpose which is believed to be clearly apparent to those skilled in the art to which my present invention appertains.

Surrounding the hub 1 and in predetermined spaced relation relative thereto is the rim 4 provided with the tire 5 preferably of rubber, although I do not wish to be understood as limiting myself in any way as to the exact material from which said tire may be made. I wish, however, to especially state that under no conditions is it necessary to employ a pneumatic tire or the like.

Projecting inwardly and radially from the rim 4 are the equidistantly spaced studs 6, the periphery of each being threaded in order to permit detachable engagement therewith of the collar 7 through which is adapted to be loosely directed the elongated sleeve 8, the inner end of the collar 7 being provided with an annular flange 9 adapted to coact with a suitable seat 10 formed in the outer end of the sleeve 8 whereby said sleeve may be effectually and conveniently clamped in operative position. The end portion of the bore of the sleeve 8 adjacent the extremity provided with a head is threaded, as indicated at 11, in order to permit detachable engagement of said sleeve with the threaded extremity of the straight portion 12 of a spoke S, whereby it will be readily perceived that upon axial rotation of the sleeve 8, the tension of the spoke may be readily and conveniently regulated. I prefer to have the sleeve 8 angular in cross section in order that the same may be engaged by a suitable tool for imparting the necessary axial rotation thereto. This is also true of the collar 7. I also find it of advantage to have the outer extremity of the stud 6 provided with a radial recess in order to accommodate the outer extremity of the spoke so that no obstruction may be offered thereto at the time the tension thereof is adjusted. While the stud 6 may be applied to the rim 4 in any manner desired, I find it of advantage to have the same detachably engaged therewith by being in threaded engagement and in order to expedite such attachment of the stud with the rim, I have the free end thereof also provided with the groove or square 14 in order to permit the use of the requisite tool for applying or removing the stud.

The inner end portion of each of the spokes S is disposed on such a curve, as indicated at 15, that when the spoke is in a perpendicular position, the pressure thereon will be received by the substantially horizontal portion of the curve 15 and whereby any shock or vibration will be substantially entirely absorbed by such curved portion before the same reaches the hub 1 or the axle upon which the hub may be mounted.

The inner extremity of the spoke is hingedly engaged through the medium of the removable bolt 16 between a pair of the flanges 2, and it is to be observed that in the completed wheel, the engagement of the inner ends of the spokes are in staggered relation and alternately at opposite sides of the hub whereby it will be readily perceived that the spokes serve to materially strengthen the completed wheel against pressure during such times the wheel may side sweep. It will also be observed that by this arrangement, the spokes serve to effectually absorb the shock or vibration incident to the side sweeping of the wheel. It is also to be observed that the curved portions 15 of the spokes are flattened which in practice I have found serves to materially soften the action of the wheel and to give a maximum of efficiency as pertains to the absorption of shock or vibration.

In order to prevent dust or other foreign substances from entering between the respective pairs of flanges or disks 2 which would otherwise have a tendency to impair the efficiency of the device, I find it of advantage to interpose between adjacent spokes at their hub connections the cap members C. As herein disclosed, each of such members comprises a single piece of resilient material bent intermediate its length into substantially a V-shape with the free extremities thereof provided with the inwardly disposed overlying extensions 17 and with the reversely directed spaced projections 18 between which the adjacent spokes are adapted to be positioned. By this arrangement it will be readily perceived that an effective means is provided for preventing entrance of any foreign substances between the flanges and that the same are free for movement under the influence of the movements of the spokes and in no wise tend to interfere therewith. In order to hold such cap members C against displacement, I find it of advantage to dispose through the flanges 2 the bolts 19 which are also disposed through the inner end of the members and for which purpose I find it of advantage to have the inner end of such members provided with the substantial loop 20.

From the foregoing description, it is thought to be obvious that a wheel constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A device of the character described comprising a hub provided with spaced flanges, a rim disposed around the hub in spaced relation relative thereto, spokes secured to the rim and hingedly engaged between the flanges of the hub, and expansible cap members positioned between the flanges intermediate adjacent spokes, said cap members comprising overlying extensions.

2. A device of the character described comprising a hub provided with spaced flanges, a rim disposed around the hub in spaced relation relative thereto, spokes secured to the rim and hingedly engaged between the flanges of the hub, expansible cap members positioned between the flanges intermediate adjacent spokes, said cap members comprising overlying extensions, and spaced projections between which the coacting spokes are positioned.

3. A device of the character described comprising a hub provided with spaced flanges, a rim disposed around the hub in spaced relation relative thereto, spokes secured to the rim and hingedly engaged between the flanges of the hub, and expansible cap members positioned between the flanges intermediate adjacent spokes, each of said cap members comprising a single piece of resilient material bent intermediate its length into substantially a V-shape with the free extremities thereof provided with inwardly disposed overlying extensions and with reversely directed spaced projections between which the adjacent spokes are adapted to be positioned.

4. A device of the character described comprising a hub provided with spaced flanges, a rim disposed around the hub in spaced relation relative thereto, spokes secured to the rim and hingedly engaged between the flanges of the hub, and expansible cap members positioned between the flanges intermediate adjacent spokes, each of said cap members comprising a single piece of resilient material bent intermediate its length into substantially a V-shape with the free extremities thereof provided with inwardly disposed overlying extensions and with reversely directed spaced projections between which the adjacent spokes are adapted to be positioned, the apex of the member being disposed inwardly.

5. A device of the character described comprising a hub provided with spaced flanges, a rim disposed around the hub in spaced relation relative thereto, spokes secured to the rim and hingedly engaged between the flanges of the hub, expansible cap members positioned between the flanges intermediate adjacent spokes, each of said cap members comprising a single piece of resilient material bent intermediate its length into substantially a V-shape with the free extremities thereof provided with inwardly disposed overlying extensions and with reversely directed spaced projections between which the adjacent spokes are adapted to be positioned, the apex of the member being disposed inwardly, and means carried by the flanges coacting with the apex of the member for holding the same against displacement.

In testimony whereof I hereunto affix my signature in the presence of two witnesses.

NOAH L. HAYDEN.

Witnesses:
 H. B. HUNTER,
 R. T. EDWARDS.